May 31, 1960 L. W. GATES 2,938,322
MOWER SUPPORTING AND LIFTING MEANS
Filed Sept. 27, 1957 2 Sheets-Sheet 1

INVENTOR
LAUREN W. GATES
Joseph Allen Brown
ATTORNEY

May 31, 1960 L. W. GATES 2,938,322
MOWER SUPPORTING AND LIFTING MEANS
Filed Sept. 27, 1957 2 Sheets-Sheet 2

INVENTOR
LAUREN W. GATES
Joseph Allen Brown
ATTORNEY

United States Patent Office 2,938,322
Patented May 31, 1960

2,938,322

MOWER SUPPORTING AND LIFTING MEANS

Lauren W. Gates, New Holland, Pa., assignor to Sperry Rand Corporation, New Holland, Pa., a corporation of Delaware Filed Sept. 27, 1957, Ser. No. 686,641

5 Claims. (Cl. 56—25)

The present invention relates generally to mowers and more particularly to field mowers of the type having cutting means engageable with the ground and freely movable up and down responsive to variations in ground contour. Still more specifically, the invention relates to an improved device for supporting and lifting the cutting means, such device including positioner means which maintains a hand lever for lifting the cutting means within ready reach of the mower operator.

Heretofore, mowers have been provided having means for supporting and lifting cutting means which comprised a lever arm pivotally mounted on the mower frame and connected to the cutting means whereby when the cutting means moved up and down the lever arm was pivoted. It has been practised to fixedly connect the hand lever for lifting the cutting means to this lever arm, such hand lever being close to the operator. Difficulty has been experienced in that when the lever arm pivots, the hand lever oscillates. At any given moment, the hand lever might be stationary. However, when the operator reaches for it as the mower moves along, the hand lever might "kick" and hit the operator's hand causing injury.

Other mowers have been provided wherein the hand lever is mounted in a fixed position. Such a structure protects the operator from injuries caused by an oscillating hand lever. However, many of these structures restrict the "floating" movement of the cutting means as it travels along the ground thereby impairing the operation of the mower.

Also, mowers have been provided having hand levers mounted so as not to restrict or impair the floating of the cutting means and nevertheless remain relatively stationary alongside the operator. However, such structures have been relatively expensive and complicated, and/or inefficient in accomplishing their desired purpose.

One object of this invention is to provide, in a field mower of the type having floating cutting means, an improved support device which includes means for positioning the hand lever for lifting the cutting means within ready reach of the operator, such device avoiding the disadvantages of devices which cause the hand lever to oscillate constantly as a result of the floating of the mower and/or remain fixed, thereby restricting the floating action.

Another object of this invention is to provide a device which yieldably maintains the hand lever in a neutral position, the hand lever being movable from such position, however, responsive to extensive floating movement of the cutting means.

Another object of this invention is to provide in a device of the character described means for returning the hand lever to its neutral position after it has been moved therefrom, such return means including means for cushioning the recoil of such return.

A further object of this invention is to provide a device of the character described which can be manufactured and assembled at low cost.

Other objects of this invention will be apparent hereinafter from the specification and from the recital in the appended claims.

Figure 1:
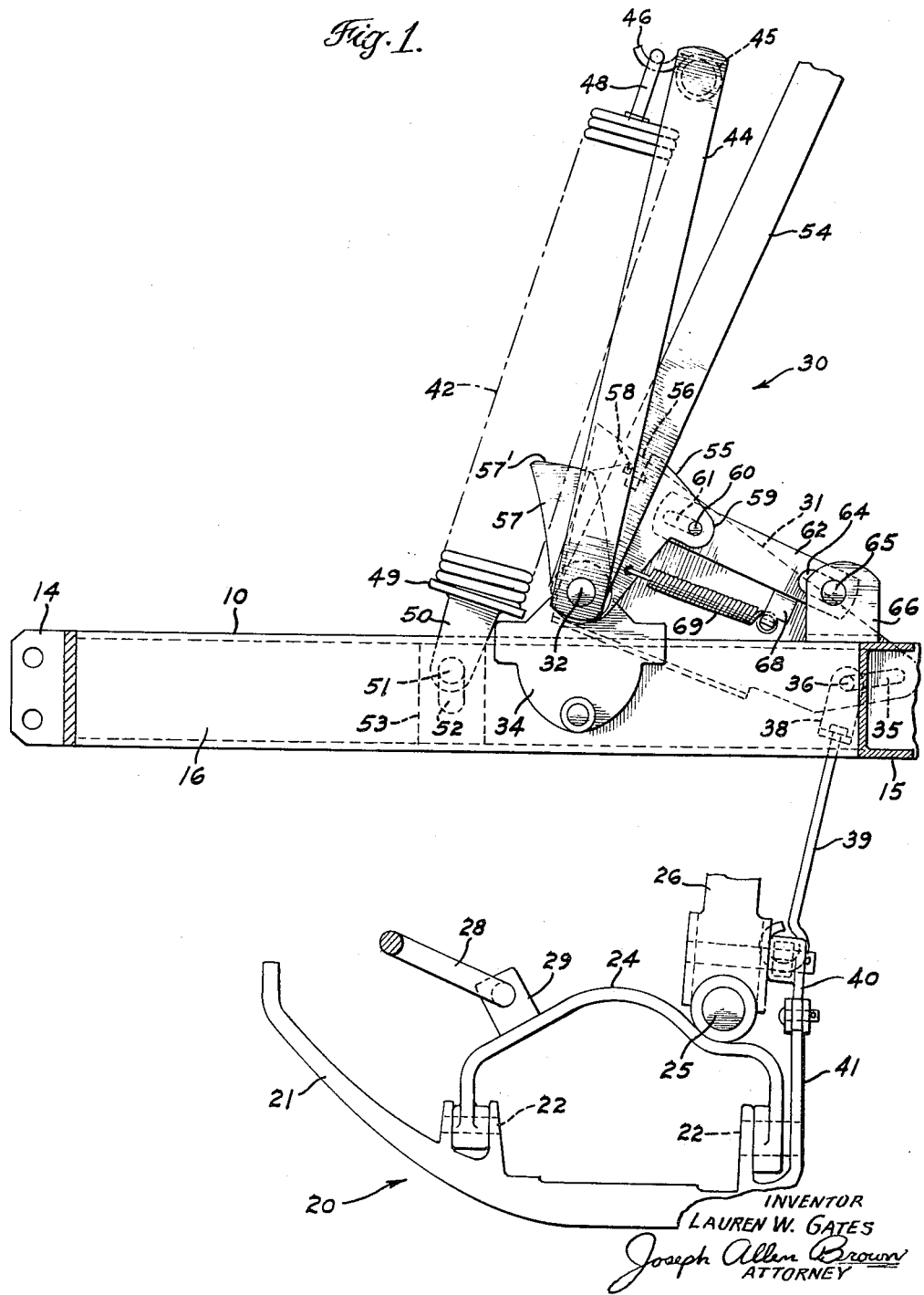
Fig. 1 is a fragmentary part side elevation, part section of a mower having means constructed according to this invention for supporting the cutting means. Extraneous portions of the mower playing no part in the present invention have been omitted.

Referring now to the drawings by numerals of reference, there is illustrated only that much of the mower necessary for an understanding of the invention. All associated structure may be of any conventional design, although preferably similar to that shown and described in detail in U.S. Patent No. 2,786,319, issued March 26, 1957.

The pertinent structure illustrated comprises three major units, namely, the frame for the mower, denoted 10, the cutting means denoted 20, and the improved support device of this invention denoted 30.

As shown in Fig. 1, frame 10 has a forward end 14 and a rear end 15. End 14 is connectable to and supportable by a tractor draw bar, while end 15 may be supported by a ground wheel, not shown. The frame includes a longitudinally extending member 16 on which support device 30 is mounted.

Cutting means 20 is of the conventional, reciprocable type as shown, for example, in U.S. Patent No. 2,786,319. It is supported when in operative position by ground engageable shoes at each end of the cutter. An inner shoe 21 is shown. Shoe 21 is pivotally connected at 22—22 to a yoke 24 carried on a support bar 25. Bar 25 is supported from frame 10 as shown in the above mentioned patent, such support including a lever 26 for angularly adjusting the cutting means about the axis of the bar 25. The cutting means extends transversely relative to member 16 of frame 10, there being provided a conventional drag link 28 connected at 29 to yoke 24. Link 28 is releasably connected at its end opposite connection 29 to frame 10 by means not shown; but, such connection may be similar to that shown in Patent No. 2,786,319.

Cutting means 20 is resiliently supported from frame 10 by device 30 which comprises a lift arm 31 pivotally mounted on a pin 32 carried on a bearing 34 suitably fastened to member 16 of frame 10. Pin 32 has an axis which extends generally parallel to the transverse extension of the cutting means. The lift arm is pivotal in a vertical plane about the axis of the pin.

Lift arm 31 extends rearwardly from pin 32 and has a lost motion slot 35 in its outer or rearward end. Connected to arm 31 by a pin 36 projecting through slot 35 is a clevis 38. Cutting means 20 is connected to this clevis through links 39, 40 and 41. In detail, this linkage may be similar to that shown in the aforementioned patent.

The weight of the cutting means tends to pivot the lift arm clockwise or downwardly about the axis of pin 32 (Fig. 1). Such pivotal movement is resisted by a spring 42 connected to the lift arm via oscillatable lever 44. Lever 44 is affixed by welding or the like to the front end of lift arm 31 and is pivotal about pin 32. It extends vertically above the lift arm a considerable distance having a sleeve or abutment 45 affixed to its upper end. Connected to sleeve 45 is an arcuate rocker arm 46 which extends forwardly and through a loop member 48 connected to one end of spring 42. Spring 42 extends vertically in front of lever 44. The lower end of the spring is fastened to a support 49 having a leg 50 connected to member 16 of frame 10 by a pin 51 which extends through a slot 52 in a bracket 53. Member 16 of frame 10 is similar to member 15, that is it is U-shaped in cross-section. The bracket 53 extends between the upper and lower legs of the member and is welded thereto.

From the structure thus far described, it will be seen that downward movement of the cutting means will be resiliently resisted by spring 42. When a low area in a field is encountered by the mower, cutting means 20 may drop against the resistance of spring 42. Downward movement of the cutting means will cause the lift arm 31 to swing downwardly and lever 44 and spring 42 to pivot rearwardly. When higher ground is encountered, the cutting means will rise, spring 42, lever 44 and arm 31 moving back to original position. Thus, arm 31 pivots up and down about pin 32, and lever 44 and spring 42 freely oscillate back and forth about their pivots 32 and 51, respectively, responsive to floating action of the cutting means. In no way is such floating action impaired by the supporting means.

In order that the cutting means may be elevated when not in use, a hand lever 54 is provided. Hand lever 54 extends vertically, having a lower end pivotally mounted on pin 32 and an upper end not shown, within ready reach of the operator. Lever 54 extends upwardly and rearwardly. The hand lever is maintained in position by a stabilizer 55 pivotal on pin 32. Stabilizer 55 has a notch 56 in which a detent 58 on the hand lever fits. The detent is movable into and out of notch 56 by any suitable conventional means, not shown. In the drawings, the hand lever is shown disposed so that the cutting means is in lowered position. To raise the cutting means, the operator releases detent 58, grasps the hand lever and pivots it forwardly or counterclockwise. The hand lever is movable in the same plane as the sleeve 45 on lever 44. As a result, when the hand lever is moved forwardly it comes into engagement with the sleeve 45 and forces lever 44 to pivot forwardly. This pivots lift arm 31 upwardly and elevates the cutting means. To lock the cutting means in elevated position, a fixed quadrant 57 is provided on the support bearing 34. Quadrant 57 has a cam face 57' engageable with detent 58. The detent slides up over this face and then drops over the forward end of the quadrant thereby preventing rearward pivotal movement of the hand lever. When the operator wishes to lower the mower, he retracts the detent 58, allowing it to clear quadrant 57 and the cutting means to drop downwardly under its own weight. Then he resets detent 58 in stabilizer notch 56.

When the cutting means is in lowered position and resting on the ground, the hand lever 54 assumes a position as shown in Fig. 1. As illustrated, the hand lever is disposed rearwardly of the oscillatable lever 44. When the mower is operated, that is moved over a field, lever 44 will oscillate back and forth responsive to the "floating" of the cutting means. Usually, lever 44 will oscillate without engaging hand lever 54.

The hand lever is maintained in the position shown in Fig. 1 by a unitary device including a spring 69. As shown, stabilizer 55 has a rearwardly extending nose 59 which carries a laterally extending pin 60. Pin 60 projects through a lost-motion front slot 61 in one end of a reciprocable link 62. Link 62 extends downwardly and rearwardly, its opposite end having a lost-motion rear slot 64 through which a pin 65 extends. Pin 65 is carried on and projects laterally from an upstanding ear 66 affixed to member 16 of the frame 10. Link 62 carries a hook 68 to which one end of the spring 69 is connected. The opposite end of spring 69 is connected to stabilizer 55 adjacent pivot pin 32. These parts are so arranged that hand lever 54 is resiliently urged in a counterclockwise direction, such movement being limited by the pins 60 and 65 in the rearward ends of their respective slots, thereby yieldably maintaining the hand lever in the position shown in Fig. 1.

Figure 2:
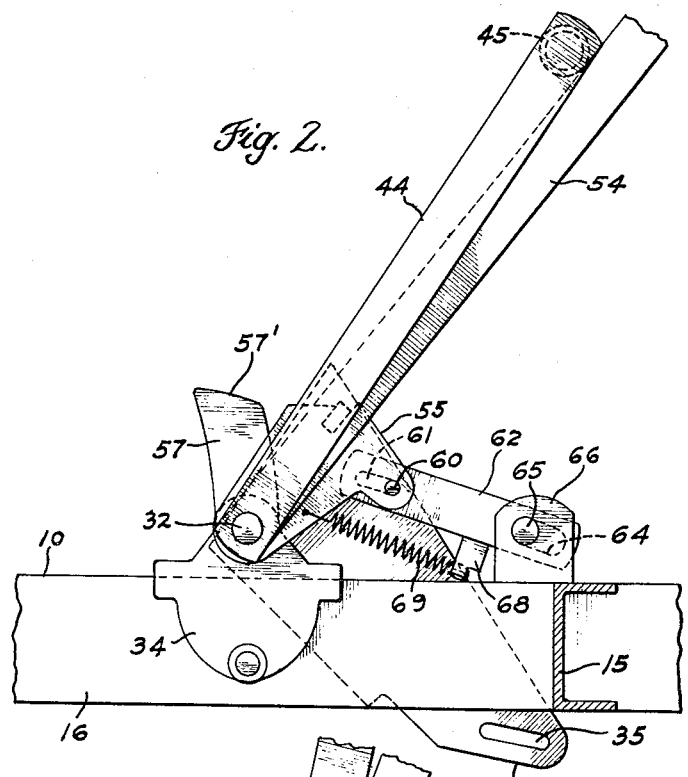
Fig. 2 is a fragmentary view similar to Fig. 1, with certain parts omitted, showing the support means of this invention in one operative position.

As previously stated, when lever 44 oscillates with floating movements of the cutting means, it usually does so without engaging the hand lever 54. However, when an unusually ground depression is encountered by the cutting means, such means may drop considerably causing lift arm 31 to swing downwardly as shown in Fig. 2. When this happens the sleeve 45 on the lever 44 will engage the hand lever and pivots it rearwardly. As the hand lever swings rearwardly, the stabilizer 55 to which it is connected is likewise pivoted. Stabilizer 55 acting through the pin 60 disposed in the rear end of slot 61 forces link 62 rearwardly. This causes the spring 69 to be extended and thereby store energy. Also, the pin 65 now assumes a position in the forward end of slot 64.

Figure 3:
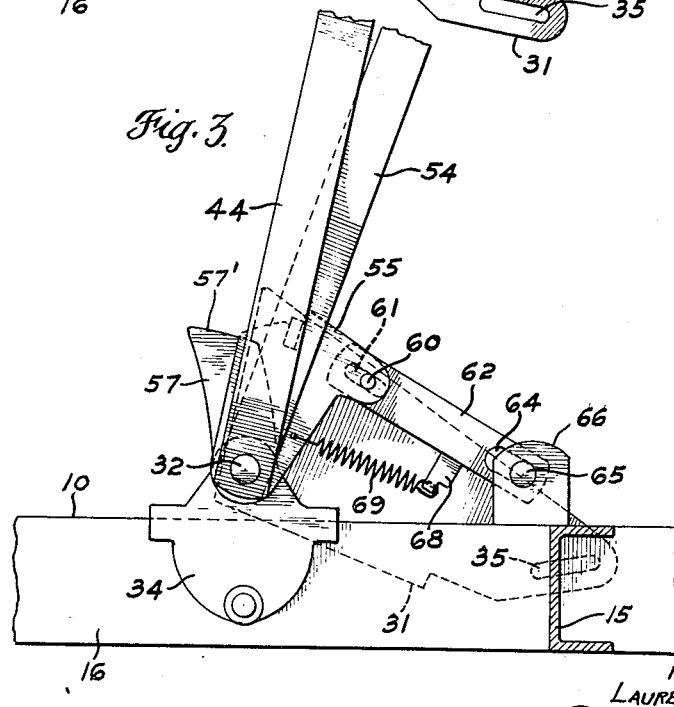
Fig. 3 is a view similar to Fig. 2 showing the supporting device in another operative position.

When a higher elevation is encountered, the cutting means will be elevated. Lift arm 31 will pivot counterclockwise or upwardly about pin 32 toward the position shown in Fig. 3. When the lever 44 moves back to the position shown in Fig. 1, there is a tendency for the hand lever to recoil sharply under the urging of spring 69 and move past its neutral, at-rest position. To solidly stop the hand lever at its neutral position would subject the supporting structure to undesirable shocks. However, in the structure employed no such shocks are created. When the hand lever returns, it may move past its neutral position in a forward direction. When this happens, the link 62 which has been shifted back to the position shown in Fig. 1, is stopped by pin 65. However, as the hand lever moves forwardly and past its neutral position the pin 60 on stabilizer 55 will move forwardly in slot 61. When this occurs, the spring 69 will be extended as shown in Fig. 3. Thus, the recoil or return of the hand lever will be cushioned. When the recoil force is absorbed, the lever assumes the position shown in Fig. 1.

Thus, with applicant's structure, while the lever 44 oscillates with the floating of the cutting means the hand lever is normally maintained in a stationary position next to the operator. In the unusual instance when the hand lever is moved, it is resiliently returned to its at-rest or neutral position and such return is cushioned. Thus, the supporting structure described possesses all of the advantages of prior supporting structures which permit free floating movement of the cutting means yet provide the advantages of a relatively fixed hand lever.

While this invention has been described in connection with a particular embodiment thereof, it will be understood that it is capable of further modification, and this application is intended to cover any variations, uses, or adaptations of the invention, following, in general, the principles of the invention and including such departures from the present disclosure, as come within known or customary practice in the art to which the invention pertains, and as fall within the scope of the invention or the limits of the appended claims.

Having thus described my invention, what I claim is:
1. In a mower, a frame having a forward end and a rear end, cutting means, means supporting said cutting means on said frame for vertical floating movement relative thereto responsive to variations in ground contour, said supporting means including a vertical lever oscillatable forwardly and rearwardly responsive to up and down movements of said cutting means, a hand lever operable through said supporting means for elevating said cutting means, said hand lever being pivotally connected to said frame and extending upwardly therefrom rearwardly of said oscillatable lever and in a neutral position normally spaced therefrom, said oscillatable lever being engageable with said hand lever and causing it to pivot rearwardly from said neutral position upon downward movement of said cutting means below a predetermined point, and a unitary device for resisting movement of said hand lever from said neutral position, for returning the hand lever to said neutral position after said cutting means has moved above said predetermined point and for cushioning such return, such unitary device comprising a stabilizer, means releaseably connecting said hand lever to said stabilizer, a reciprocable link extending rearwardly from said stabilizer to said frame, said link having a front slot and a rear slot, each of said slots extending in a forward to rearward direction, a pin on said stabilizer projecting through said front slot, a pin on said frame projecting through said rear slot, and a spring between said link and stabilizer urging said link forwardly.

2. In a mower, a frame having a forward end and a rear end, cutting means, means supporting said cutting means on said frame for vertical floating movement relative thereto responsive to variations in ground contour, said supporting means including a vertically extending lever pivotally connected at its lower end to said frame and having an abutment at its upper end, means biasing said upper end forwardly, said lever pivoting rearwardly on downward movement of said cutting means and being pivoted forwardly by said biasing means when said cutting means thereafter moves upwardly, a hand lever pivotally connected to said frame at the same point as said lever, said hand lever extending upwardly and in a normal neutral position rearwardly spaced from said abutment on said lever, said abutment being engageable with said hand lever and causing it to pivot rearwardly from said neutral position upon downward movement of said cutting means below a predetermined point, and a unitary device for resisting movement of said hand lever from said neutral position, for returning the hand lever to said neutral position after said cutting means has moved above said predetermined point and for cushioning such return, such unitary device comprising a stabilizer, means releasably connecting said hand lever to said stabilizer, a reciprocable link extending rearwardly from said stabilizer to said frame, said link having a front slot and a rear slot each of which extend in a forward to rearward direction, a pin on said stabilizer spaced vertically from said pivotal connection of said hand lever with said frame and projecting through said front slot, a pin on said frame projecting through said rear slot, and a tension spring having one end connected to said stabilizer between said pivotal connection and said pin, the other end of said spring being connected to the end of said link adjacent said rear slot.

3. In a mower, a frame, cutting means, means supporting said cutting means on said frame for vertical floating movement relative thereto responsive to variations in ground contour, said supporting means including a lever which is oscillated responsive to floating movements of said cutting means, a hand lever supported on said frame in a neutral position normally spaced from said oscillatable lever and operable through said supporting means for elevating said cutting means, said oscillatable lever being engageable with said hand lever upon downward movement of said cutting means below a predetermined point and moving said hand lever from said neutral position, and a unitary device for resisting movement of said hand lever from said neutral position, for returning the hand lever to said neutral position after said cutting means has been elevated from said predetermined point, and for cushioning such return, said unitary device comprising a link reciprocable responsive to movement of said hand lever, a lost-mostion connection between said link and said hand lever, a lost-motion connection between said link and said frame, and a spring connected between said link and hand lever in a position such that movement of the hand lever on either side of said neutral position causes an extension of said spring.

4. In a mower, a frame, an oscillatable lever, a hand lever, both of said levers extending upwardly from said frame and having lower ends pivotally mounted thereon, said oscillatable lever being engageable with said hand lever on movement in one direction beyond a predetermined point, said hand lever having a normal neutral position spaced from said oscillatable lever and outside the normal oscillating range thereof, said hand lever being pivoted from said neutral position when engaged by said oscillating lever, the combination of a unitary device for yieldably maintaining said hand lever in said neutral position, for returning it to said neutral position after it has been moved therefrom, and for cushioning such return, said unitary device comprising a link reciprocable responsive to pivotal movement of said hand lever, a lost-motion connection between said link and said hand lever, a lost-motion connection between said link and said frame, and a spring connected between said link and hand lever in a position such that pivotal movement of the hand lever on either side of said neutral position causes an extension of said spring.

5. In a mower, a frame, cutting means, means supporting said cutting means on said frame, a hand lever extending upwardly from said frame and having a lower end pivotally connected thereto, means for connecting said hand lever to said supporting means whereby said cutting means may be raised and lowered by said hand lever, said hand lever having a normal neutral position and being pivotal therefrom upon up and down movement of said cutting means responsive to ground variations, and a unitary device for yieldably maintaining said hand lever in said neutral position, for returning it to neutral position after it has been pivoted therefrom, and for cushioning the return, said device comprising a link reciprocable responsive to pivotal movement of said hand lever, a lost-motion connection between said link and said hand lever, a lost-motion connection between said link and said frame, and a spring connected between said link and hand lever in a position such that pivotal movement of the hand lever on either side of said neutral position causes an extension of said spring.

References Cited in the file of this patent

UNITED STATES PATENTS

| | | |
|---|---|---|
| 2,786,319 | Happe et al. | Mar. 26, 1957 |

FOREIGN PATENTS

| | | |
|---|---|---|
| 140,299 | Great Britain | Mar. 25, 1920 |
| 505,788 | Great Britain | May 17, 1939 |
| 712,110 | Great Britain | July 21, 1954 |